(12) United States Patent
Ozawa

(10) Patent No.: US 7,639,327 B2
(45) Date of Patent: *Dec. 29, 2009

(54) LIQUID CRYSTAL DISPLAY AND ELECTRONIC APPARATUS HAVING A QUASI-ISOTROPIC LIQUID CRYSTAL MATERIAL

(75) Inventor: Kinya Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/219,199

(22) Filed: Jul. 17, 2008

(65) Prior Publication Data

US 2008/0316403 A1    Dec. 25, 2008

Related U.S. Application Data

(63) Continuation of application No. 11/297,347, filed on Dec. 9, 2005, now Pat. No. 7,420,635.

(30) Foreign Application Priority Data

Feb. 3, 2005    (JP)    ............................. 2005-028204

(51) Int. Cl.
G02F 1/1335    (2006.01)
G02F 1/1343    (2006.01)
(52) U.S. Cl. ...................... 349/114; 349/141
(58) Field of Classification Search ................ 349/114, 349/141, 2, 84
See application file for complete search history.

(56) References Cited

U.S. PATENT DOCUMENTS

| 6,914,656 | B2 | 7/2005 | Sakamoto et al. |
| 7,088,409 | B2 | 8/2006 | Itou et al. |
| 7,239,365 | B2 | 7/2007 | Chang et al. |
| 7,321,408 | B2 | 1/2008 | Yang |
| 7,339,641 | B2 | 3/2008 | Zhu et al. |
| 7,420,635 | B2 * | 9/2008 | Ozawa ....................... 349/114 |
| 2003/0067579 | A1 | 4/2003 | Inoue et al. |
| 2005/0140902 | A1 | 6/2005 | Yang et al. |

FOREIGN PATENT DOCUMENTS

| JP | A-2003-207795 | 7/2003 |
| JP | A-2003-327966 | 11/2003 |
| JP | A-2004-219553 | 8/2004 |
| KR | 2004-0085789 | 10/2004 |
| KR | 10-0677836 | 1/2007 |
| WO | WO 2004/029697 | 4/2004 |

* cited by examiner

Primary Examiner—Mike Qi
(74) Attorney, Agent, or Firm—Oliff & Berridge, PLC

(57) ABSTRACT

A transflective liquid crystal display that includes a liquid crystal layer interposed between a pair of substrates facing each other and a transparent display area for transparent display and a reflecting display area for reflecting display within a single pixel area, wherein the liquid crystal layer is composed of a quasi-isotropic liquid crystal material that is optically isotropic when non-selected electric field is applied and is optically anisotropic when selected electric field is applied, the flexibility of which changing according to the electric field intensity, and the electric field intensity is supposed to be set smaller in the reflecting display area than in the transparent display area.

11 Claims, 6 Drawing Sheets

LIQUID CRYSTAL DISPLAY AND ELECTRONIC APPARATUS HAVING A QUASI-ISOTROPIC LIQUID CRYSTAL MATERIAL

This is a Continuation of application Ser. No. 11/297,347 filed Dec. 9, 2005. The disclosure of the prior application is hereby incorporated by reference herein in its entirety.

BACKGROUND

1. Technical Field

The present invention relates to a liquid crystal display and an electronic apparatus.

2. Related Art

Liquid crystal displays (transflective liquid crystal displays) that utilize external light in bright places in a manner similar to that of normal reflective liquid crystal displays and make the display visible with an internal light source in dark places have been proposed. Such a liquid crystal display uses a display system that is both reflective and transparent to achieve a clear display even in darkness as well as to lower power consumption by switching the display mode between the reflection mode and the transparent mode according to the surrounding brightness.

It is considered preferable that a transflective liquid crystal display has a multigap structure such as shown in JP-A-2004-219553 to effectively carry out reflective display and transparent display.

A semi-transmissive reflective liquid crystal display having a multigap structure will be now described.

A liquid crystal display 100 contains a liquid crystal cell 110 and a backlight 120 (a lighting system), as shown in FIG. 8. In the liquid crystal cell 110, a lower substrate 130 and an upper substrate 140 are placed facing each other, with a liquid crystal layer 160 formed therebetween. The backlight 120 is placed on the rear surface side of the liquid crystal cell 110 (on the external surface side of the lower substrate 130).

A semi-transmissive reflecting layer 180 having a metal film with a high reflectance is formed on the inner surface side of the lower substrate 130 that is composed of a translucent material, such as glass and plastic. An orifice 180a is placed for each pixel, on the semi-transmissive reflecting layer 180, for transmitting the light emitted from the backlight 120. Within the forming area of the semi-transmissive reflecting layer 180, the part on which a metal film is actually formed constitutes a reflective display area R while the orifice 180a on which a metal film is not formed constitutes a transflective display area T.

Further, a color filter layer 150 (150R and 150T) composed of a color filter for reflective display 150R and a color filter for transparent display 150T is placed on the inner surface side of the lower substrate 130. The color filter for reflective display 150R is placed on the semi-transmissive reflecting layer 180, which corresponds to the reflective display area R, while the color filter for transparent display 150T is placed on the orifice 180a of the semi-transmissive reflecting layer 180, which corresponds to the transparent display area T.

On the position that corresponds to the reflective display area R of the color filter layer 150, a terraced part 210, such as a resin layer, and a phase contrast layer 200 are sequentially laminated.

The phase contrast layer 200 gives a phase shift of about 100 to 200 nm to the incident visible light transmitted to the liquid crystal cell 110, working as a quarter wavelength plate to the visible light. The phase contrast layer 200 is composed as a polymer liquid crystal that is formed by photo polymerization, for example, of a liquid crystal monomer.

The terraced part 210 is composed of an insulating material, such as an acrylic resin, and is protruded to the liquid crystal layer 160. The terraced part 210, the thickness of which is almost half of the liquid crystal layer thickness, works as an adjusting layer of the liquid crystal layer thickness for making the liquid crystal layer thickness smaller on the reflective display area R than on the transparent display area T. Specifically, the optical path length for transparent display and the optical path length for reflective display can be made almost equal by placing the terraced part 210 on the reflective display area R.

Further, a pixel electrode 230 composed of a transparent conductive material, such as ITO, is formed on the lower substrate 130 in a manner of covering the phase contrast layer 200, the terraced part 210 and the color filter layer 150. Moreover, an alignment layer 240 composed of polyimide or the like is laminatedly formed in a manner of covering the pixel electrode 230. A lower polarizing plate 280 is placed on the external surface side of the lower substrate 130.

Meanwhile, a common electrode 320 composed of a transparent conductive material, such as ITO, and an alignment layer 330 composed of polyimide or the like are sequentially laminated on the internal surface side of the upper substrate 140 that is composed of a translucent material, such as glass or plastic. An upper polarizing plate 360 is placed on the external surface side of the upper substrate 140.

In this way, a multigap structure, such as described above, has a transparent display area T and a reflective display area R within one pixel, with a terraced part 210 formed on their boundaries with a resin layer or the like.

However, having a resin layer (a terraced part), such as described above, has resulted in problems, such as mentioned below. Specifically, placing a resin layer, such as described above, usually causes an inclined plane to be formed on the terraced part. Light will not be reflected efficiently on such an inclined plane. Further, it is not preferable in terms of optimizing the intensity of an output light (a reflected light and a transmitted light) because the optical path length changes continuously on the part corresponding to the inclined plane. There is also a problem that contrast is easily lowered due to decrease in the intensity of output light or to reflection (or transmission) of unnecessary light. There is an option of placing a resin layer in a manner so that an inclined plane may not be formed. In such a case, however, the angle of the angled part, shown as E in the drawing, becomes so small (less than 90 degrees) that the adhesiveness of the phase contrast layer 200, the pixel electrode 230, the alignment layer 240 and the like may be drastically degraded, which causes degradation of the reliability and the durability of the entire liquid crystal display.

Further, a resin layer, such as described above, produces dead space, which is disadvantageous in terms of making devices thinner. There also has been a problem that the liquid crystal alignment is disrupted at the terraced part on the boundaries, which causes degradation of the optical properties.

There also has been another problem that the viewing angle is narrow in a semi-transmissive reflective liquid crystal display.

SUMMARY

An advantage of the present invention is to provide a semi-transparent reflective liquid crystal display with high reliability that can achieve high visibility both in a bright environment and in a dark environment and to provide an electronic apparatus having the liquid crystal display.

The advantage is achieved in the present invention, as will be described below.

A first aspect of the invention is to provide a transflective liquid crystal display that, having a liquid crystal layer interposed between a pair of substrates facing each other, has a transparent display area for transparent display and a reflective display area for reflective display within a single pixel area. The liquid crystal layer is composed of a quasi-isotropic liquid crystal material that is optically isotropic when the non-selected electric field is applied and is optically anisotropic when the selected electric field is applied, the flexibility of which changing according to the electric field intensity. Here, the electric field intensity is supposed to be set smaller in the reflective display area than in the transparent display area.

Thus, high visibility can be achieved both in a bright environment and in a dark environment, which makes it possible to provide a semi-transparent reflective liquid crystal display with high reliability.

It is preferable in the liquid crystal display according to the first aspect of the invention that an selected electric field is applied in a direction almost parallel to the surface direction of the substrates.

Thus, a semi-transparent reflective liquid crystal display that has good visibility in all directions (with a wide viewing angle) can be provided.

It is preferable in the liquid crystal display according to the first aspect of the invention that a plurality of electrodes is placed on either one of the paired substrates, wherein the distance between the electrodes in the transparent display area and the distance between the electrodes in the reflective display area are different from each other.

Thus, the electric field scale can easily and surely be made different from each other between in the transparent display area and in the reflective display area.

It is preferable in the liquid crystal display according to the first aspect of the invention that the phase contrast Δnd in the liquid crystal layer is almost λ/2, the distance between the electrodes in the reflective display area Lr and the distance between the electrodes in the transparent display area Lt satisfying the relation "Lr<Lt".

Thus, the phase shift in the reflective display area and the phase shift in the transparent display area can be made almost equal.

It is preferable in the liquid crystal display according to the first aspect of the invention that the phase contrast Δnd in the liquid crystal layer is almost λ/4, the distance between the electrodes in the reflective display area Lr and the distance between the electrodes in the transparent display area Lt satisfying the relation "Lr>Lt".

Thus, the phase shift in the reflective display area and the phase shift in the transparent display area can be made almost equal.

It is preferable in the liquid crystal display according to the first aspect of the invention that the substrates have an almost flat surface on the side facing to the liquid crystal layer.

Thus, light can be more efficiently used, which makes it possible to achieve display with better visibility as well as to further improve the reliability (durability) of a liquid crystal display.

It is preferable in the liquid crystal display according to the first aspect of the invention that the quasi-isotropic liquid crystal material is composed of a liquid crystal compound composition that includes a low molecular weight liquid crystal material and a high polymer network that is generated among the constituent elements of the low molecular weight liquid crystal material as a result of polymerization of a non-liquid crystal monomer.

Thus, the liquid crystal response speed can be especially quickened.

It is preferable in the liquid crystal display according to the first aspect of the invention that the low molecular weight liquid crystal material can exhibit a blue phase between a cholesteric phase and an isotropic phase.

Thus, the liquid crystal response speed can be even more quickened.

It is preferable in the liquid crystal display according to the first aspect of the invention that the non-liquid crystal monomer is an acrylate monomer having an alkyl group as a side chain.

Thus, a high polymer network with high continuity can be formed, broadening the temperature range in which a blue phase is exhibited.

A second aspect of the invention is to provide an electronic apparatus including a liquid crystal display according to the first aspect of the invention.

Thus, high visibility can be achieved both in a bright environment and in a dark environment, which makes it possible to provide an electronic apparatus having a semi-transparent reflective liquid crystal display (a display unit) with high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

A liquid crystal display and an electronic apparatus according to a preferred embodiment of the invention will now be described in detail with reference to the drawings.

Liquid Crystal Display

First, a liquid crystal display according to an embodiment of the invention will be described.

Figure 1:
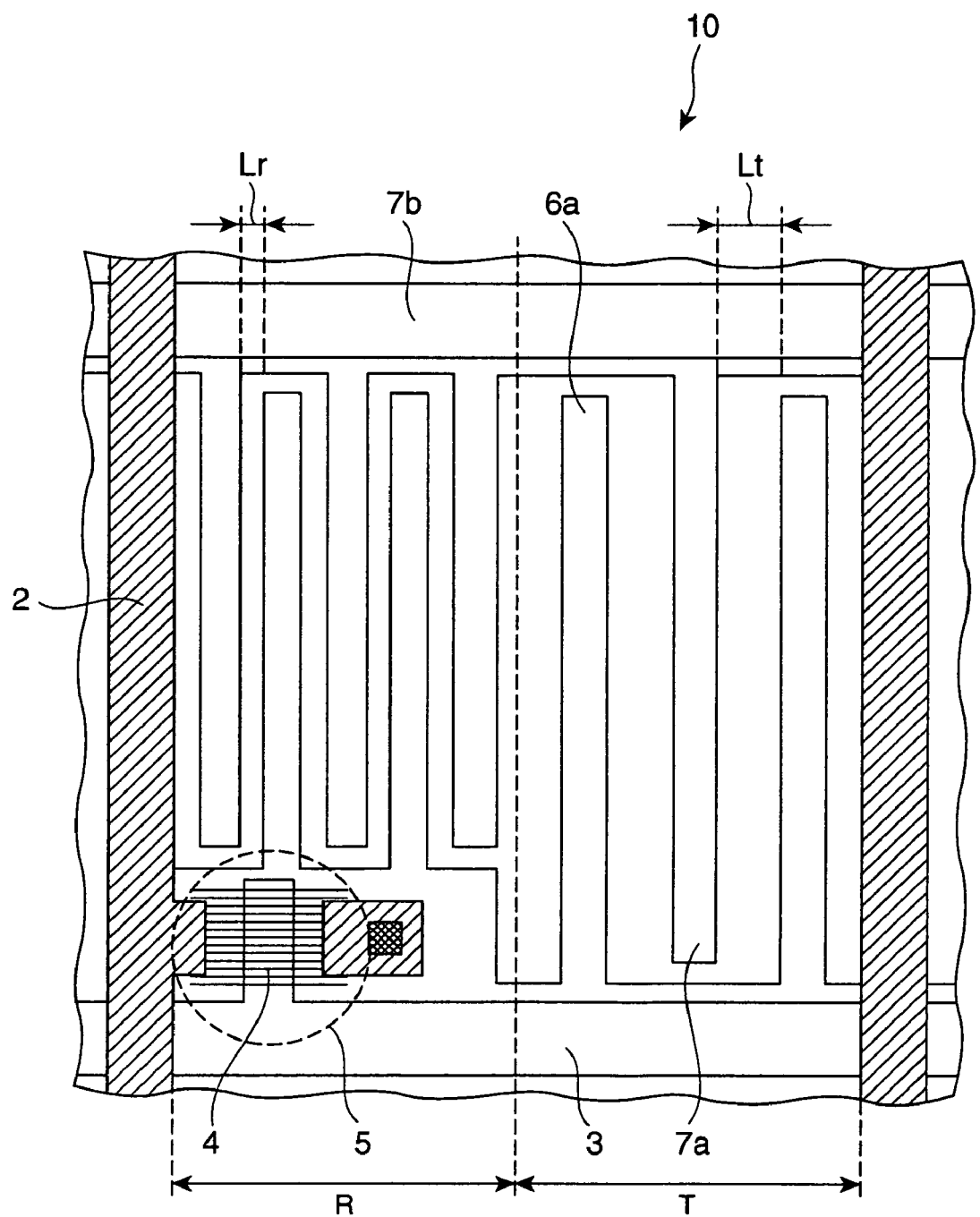
FIG. 1 is a two-dimensional diagram showing a typical example of an electrode structure of a liquid crystal display according to an aspect of the invention.
Figure 2:
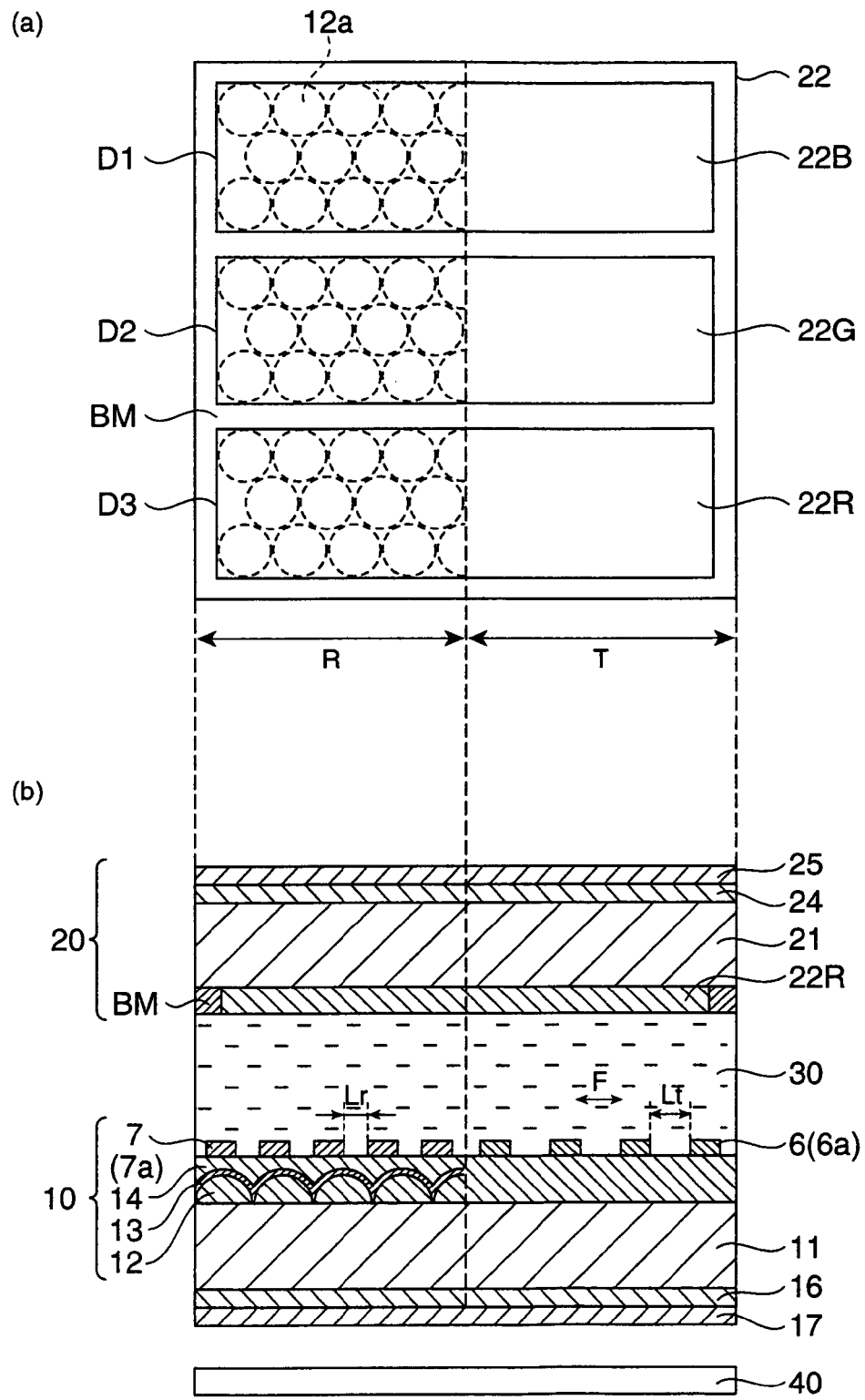
FIG. 2A is a two-dimensional diagram and FIG. 2B is a sectional view, both showing a typical example of a liquid crystal display according to an aspect of the invention.
Figure 3:
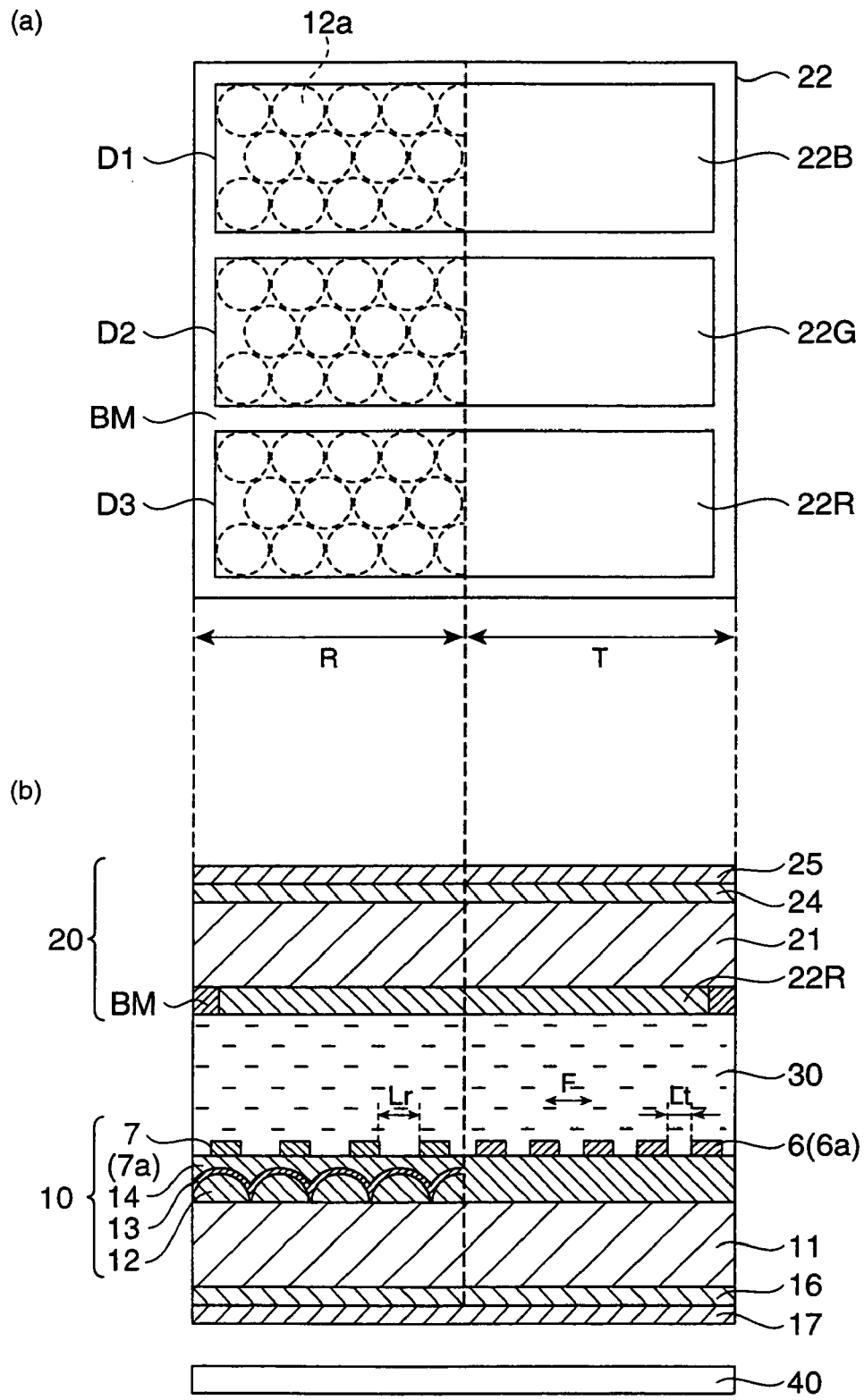
FIG. 3A is a two-dimensional diagram and FIG. 3B is a sectional view, both showing another typical example of a liquid crystal display according to an aspect of the invention.

FIG. 1 is a two-dimensional diagram showing the electrode structure of a TFT array substrate of a liquid crystal display of the embodiment. FIGS. 2A and 2B are diagrams showing a typical example of a liquid crystal display of the embodiment. FIG. 2A is a two-dimensional schematic diagram showing the plane structure of a color filter layer that is set on a liquid crystal display of the embodiment. FIG. 2B is a sectional schematic view showing the part corresponding to the red color filter layer within the two-dimensional diagram in FIG. 2A. FIGS. 3A and 3B are a two-dimensional diagram and a sectional view showing another typical example of a liquid crystal display respectively according to an embodiment of the invention. FIG. 3A is a two-dimensional schematic diagram showing the plane structure of a color filter layer that is set on a liquid crystal display of the embodiment. FIG. 3B is a sectional schematic view showing the part corresponding to the red color filter layer within the two-dimensional diagram in FIG. 3A. In FIGS. 1 to 3, a single pixel area is shown enlarged and certain parts are highlightedly shown for the sake of viewability. Further, the film thickness and the scale and the like of each constituent element are accordingly changed.

The liquid crystal display of the embodiment is an example of an active matrix liquid crystal display that uses a thin film transistor (hereinafter simply referred to as a "TFT") as a switching element.

As shown in FIG. 2A, a liquid crystal display 1 has a liquid crystal layer 30 composed, for example, of a quasi-isotropic liquid crystal material as will be described later, that is interposed between a TFT array substrate 10 and a facing substrate 20 that faces the TFT array substrate 10. On the TFT array substrate 10, an electrode structure using an in-plane switching (hereinafter simply referred to as an "IPS") system, which generates an electric field (a transversal electric field) in the in-plane direction to the substrate (in the parallel direction to the substrate surface) so that the changing of the alignment status of the liquid crystal material in the transversal electric field may yield light switching feature, is adopted.

In IPS system, a wide viewing angle (such as about a 170-degree horizontal and vertical viewing angle) and a natural image display can be achieved due to little change in color tone depending on the direction in which it is viewed as well as little change in color tone in the entire gradation range from white to black, because the alignment status of the liquid crystal material changes in the parallel direction to the substrate surface when a voltage is applied.

The electrode structure on the TFT array substrate 10 is shown in FIG. 1. A plurality of data lines 2 that outlie in the lengthwise direction in the drawing and a plurality of gate lines 3 that outlie in the crosswise direction in the drawing are placed in a matrix, in a manner of intersecting each other. The data lines 2 transmit image signals to the pixels in each line, while the gate lines 3 sequentially turn on the TFT of the pixels in each line. As shown in the drawing, the gate line 3 branches out, in the bottom left corner of each pixel, toward the inside of the pixel to form a gate electrode 4, constituting a TFT 5 for pixel switching.

In the TFT of each pixel, one terminal of the source and drain is connected to the data line 2, while the other terminal is connected to a first electrode 6. The first electrode 6 includes a plurality of electrode fingers (pixel electrodes) 6a that outlie in the lengthwise direction in the drawing FIG. 1 and is connected to the drain terminal of the TFT 5.

Further, a second electrode 7, which is pectinate, includes a plurality electrode fingers (pixel electrodes) 7a that outlie in the lengthwise direction in the drawing FIG. 1 is placed. The electrode fingers 7a of the second electrode 7, when viewed two-dimensionally, are placed between the electrode fingers 6a of the first electrode 6. Each of the electrode fingers 7a is connected to a common electrode line 7b. The second electrode 7 is connected to each other between each pixel so that a certain level of electric potential may be maintained in the entire display area. Specifically, the first electrode 6 (electrode finger 6a) is a pixel electrode and the second electrode 7 (electrode finger 7a) is a common electrode. The data line 2, the gate line 3, the first electrode 6 (electrode finger 6a), the second electrode 7 (electrode finger 7a) and the TFT 5 are all placed on the TFT array substrate 10.

The area that is surrounded by the data line 2 and the gate line 3 constitutes a pixel of the liquid crystal display of the embodiment.

Within the pixel area, a coloring layer for one of the three primary colors is placed corresponding to a pixel area, as shown in FIG. 2A, constituting a pixel that includes each of the coloring layers, 22b (blue), 22G (green) and 22R (red) with three pixel areas (D1, D2 and D3).

In the TFT array substrate 10, a reflecting film 13 composed of a metal material with a high reflectivity, such as aluminum, is partially formed on the surface of the substrate main body 11 that is composed of a translucent material, such as quartz or glass, via an insulating layer 12 composed of a resin material or the like. The forming area of the reflecting film 13 becomes the reflective display area R and the non-forming area of the reflecting film 13 becomes the transparent display area T. In this way, the liquid crystal display 1 is configured as a semi-transparent reflective liquid crystal display that can achieve both reflective display and transparent display.

The insulating layer 12 formed on the substrate main body 11 has a concavo-convex shape 12a on the surface. The reflecting film 13 has, on the surface, a concavo-convex part corresponding to the concavo-convex shape 12a. Such a concavo-convex shape scatters a reflected light, which prevents reflection from the outside, making it possible to achieve a wide viewing angle display. Further, the concavo-convex shape 12a is covered with a resin layer 14.

A first electrode 6 and a second electrode 7 that are composed of a transparent conductive material, such as an indium tin oxide (hereinafter simply referred to as an "ITO"), are formed as pixel electrodes on the surface of the TFT array substrate 10.

Although the reflecting film 13 and the pixel electrodes are separately set up and are laminated in the embodiment, it is also applicable to use, as a pixel electrode, a reflecting film that is composed of a metal material in the reflective display area R.

Meanwhile, in the transparent display area T, the insulating layer 12 is formed on the substrate main body 11 and a reflecting film 13 is not formed on the surface. Specifically, a first electrode 6 and a second electrode 7 that are composed of a transparent conductive material are formed as pixel electrodes on the resin layer 14 that covers the insulating layer 12 (the concavo-convex shape 12a).

As described above, the first electrode 6 and the second electrode 7 respectively have a plurality of electrode fingers 6a and 7a, the electrode fingers 6a of the first electrode 6 being placed between the electrode fingers 7a of the second electrode 7, when viewed two-dimensionally.

Next, on the side of the facing substrate 20, a color filter 22 (a red coloring layer 22R in FIG. 2B) is placed in contact with the substrate main body 21 (between the substrate main body 21 and the liquid crystal layer) that is composed of a translucent material, such as glass or quartz. Here, the periphery of the coloring layer 22R is surrounded with a black matrix BM, the black matrix BM constituting the boundary of each pixel area D1, D2 and D3 (refer to FIG. 2A).

Further, a phase contrast plate 16 and a polarizing plate 17 are placed on the external surface side of the TFT array substrate 10 (the other side than the surface on which the liquid crystal layer 30 is interposed) and a phase contrast plate 24 and a polarizing plate 25 are placed also on the external surface side of the facing substrate 20 so that a circularly polarized light can be entered on the internal surface side of the substrate (on the side of the liquid crystal layer 30). The phase contrast plate 16 and the polarizing plate 17, the phase contrast plate 24 and the polarizing plate 25 respectively constitute a circularly polarizing plate.

The polarizing plates 17 and 25 are configured so as to transmit only a linear polarized light that has a polarizing axis in a predetermined direction. A λ/4 phase contrast plate is adopted as phase contrast plates 16 and 24. Further, a backlight 40 is placed as a light source for transparent display on the outside of the polarizing plate 17 that is placed on the TFT array substrate 10.

Here, although the size of each part constituting a liquid crystal display of the embodiment is not particularly limited, it is preferable that the pitch of a pixel is set to be between 150 to 200 nm and the cell gap d to be between 48 to 64 nm.

Further, it is preferable that the width of each electrode finger 6a of the first electrode 6 and the width of each electrode finger 7a of the second electrode 7 is set to be between 20 to 40 nm.

Specifically, it is preferable that the pitch of a pixel is set to be around 150 nm and the number of electrode fingers 6a of the first electrode 6 and electrode finger 7a of the second electrode 7 is set to be three or four, respectively. It is also preferable that the width of each electrode finger 6a of the first electrode 6 and the width of each electrode finger 7a of the second electrode 7 is set to be around 20 nm.

In the above-mentioned liquid crystal display 1, an electrode structure of an IPS system is adopted in the TFT substrate 10, wherein the first electrode 6 and the second electrode 7 are placed within the same surface. Therefore, the liquid crystal is driven by the transversal electric field F that arises on the first electrode 6 (6a) and on the second electrode 7 (7a).

Meanwhile, in a liquid crystal display having a multigap structure, there has been a problem that the difference between the phase contrast of the light that transmits the liquid crystal layer in the reflective display area and the phase contrast of the light that transmits the liquid crystal layer in the transparent display area causes a phase shift, lowering the light use efficiency.

Here, when the liquid crystal layer thickness, for example, is defined as d and the refractive index anisotropy of the liquid crystal is defined as Δn, the phase contrast of light (retardation) is shown by their product Δn·d.

For preventing a phase shift between the phase contrast in the transparent display area and the phase contrast in the reflective display area, it is enough if at least either the liquid crystal layer thickness d or the refractive index anisotropy of the liquid crystal Δn may be set different between in the transparent display area and in the reflective display area.

However, in the case of using a usual liquid crystal material, it is difficult to drastically change the refractive index anisotropy of the liquid crystal Δn in the transparent display area and in the reflective display area. Specifically, it is difficult, in a usual liquid crystal material, to drastically change the refractive index anisotropy of the liquid crystal Δn in the transparent display area and in the reflective display area, because a liquid crystal molecule, when an electric field is applied, changes its own direction, being strongly affected by the alignment condition of the other surrounding liquid crystal molecules.

Therefore, in a liquid crystal display having an ordinal multigap structure, it is easy to make the liquid crystal layer thickness in the transparent display area larger than the liquid crystal layer thickness in the reflective display area by changing the liquid crystal layer thickness d. Specifically, an adjustment layer of the liquid crystal layer thickness is placed between the upper substrate and the reflecting layer of the lower substrate for adjusting the layer liquid crystal layer thickness between in the transparent display area and in the reflective display area. However, there has been a problem that the placing of an adjustment layer of the liquid crystal layer thickness lowers the light use efficiency, degrading the optical properties of the liquid crystal display. Further, the adjustment layer of the liquid crystal layer thickness becomes dead space, which is unfavorable also in terms of making devices thinner.

In an ordinal liquid crystal material, although a liquid crystal molecule turns around when an electric field is applied and the refractive index, when viewed from in a certain direction within the liquid crystal, changes due to the spiral alignment, the refractive index of the material itself does not change. Meanwhile, in a quasi-isotropic liquid crystal material that is used in an embodiment of the invention, an optical anisotropy can be obtained by applying an electric field, which makes it possible to change the refractive index of the material itself. Further, in the quasi-isotropic liquid crystal material that is used in an embodiment of the invention, the refractive index can be changed without any macroscopic alignment behavior or movement of the material itself when the electric field is applied.

Further, because the change amount of the refractive index depends on the electric field dimension, the refractive index anisotropy of the liquid crystal Δn can be changed by changing the electric field dimension. Therefore, in the embodiment of the invention, the amount of the refractive index of the liquid crystal material in each area can be made different by making the electric field dimension in each area (the reflective display area and the transparent display area) different from each other.

As described above, in the embodiment of the invention, the surface on the side that faces the liquid crystal layer of the substrates (the TFT array substrate and the facing substrate) can be made flat, as there is no need to place a resin layer. Therefore, the light use efficiency can be further improved, an image can be displayed with a better visibility, and the reliability (durability) of a liquid crystal display can be further improved. It is preferable that the cell thickness on the side facing the liquid crystal layer of the substrates (the TFT array substrate and the facing substrate) is set to be less than 20 μm, more preferably less than 10 μm. Thus, the above-mentioned effects will be further enhanced.

Further, in the embodiment, the electric field dimension can easily and surely be made different from each other between in the transparent display area and in the reflective display area, by making the distance between the electrodes (the distance between the electrode finger 6a of the first electrode 6 and the electrode finger 7a of the second electrode 7) different from each other between in the transparent display area and in the reflective display area, in a transversal electric field system.

Further, in the case where the distance between the electrodes in the reflective display area (Lr in the drawing) and the distance between the electrodes in the transparent display area (Lt in the drawing) are made different from each other, it is preferable that the absolute value of the difference is between 0 to 20 µm, more preferably between 0 to 10 µm, and even more preferably between 0 to 5 µm.

Further, it is preferable that the phase contrast plate gives a phase shift of about a quarter wavelength to the transparent light and the liquid crystal layer thickness in the transparent display area is about twice as large as the liquid crystal layer thickness in the reflective display area. Also preferably, the phase shift of the liquid crystal layer either in the case when a selected voltage is applied or in the case when non-selected voltage is applied is set almost zero in the reflective display area and is set almost zero in the transparent display area, while at the same time the phase shift of the liquid crystal layer in the other case is set to almost a quarter wavelength in the reflective display area and is set to almost a half wavelength in the transparent display area.

Here, "a phase shift of a quarter wavelength" means that a linearly polarized light entered onto an optical anisotropic substance (such as a liquid crystal or a phase contrast plate) is outputted as a circularly polarized light. Meanwhile, "a phase shift of a half wavelength" means that an entered linearly polarized light is outputted as a a linearly polarized light the direction of which is perpendicular to the direction of the entered linearly polarized light. "A zero phase shift" and "without a phase shift" mean that an entered linearly polarized light is outputted as a linearly polarized light the direction of which is perpendicular to the direction of the entered linearly polarized light.

Specifically, in the case where the phase contrast Δnd in the liquid crystal layer is set to be λ/2, the Δn in the liquid crystal layer in the reflective display area is set larger than the Δn in the liquid crystal layer in the transparent display area. More specifically, when the distance between the electrodes in the reflective display area is defined as Lr and the distance between the electrodes in the transparent display area is defined as Lt, Lr and Lt satisfy the relation Lr<Lt. Lr and Lt satisfy the relation Lr<Lt in FIGS. 1 and 2. Thus, the electric field dimension in the reflective display area becomes larger than the electric field dimension in the transparent display area, which makes the Δn in the liquid crystal layer in the reflective display area larger than the Δn in the liquid crystal layer in the transparent display area. In such a case, it is preferable that Lr is set to be 2 to 10 µm, more preferably 2 to 5 µm. As for Lt, it is preferable that it is set to be 4 to 20 µm, more preferably 4 to 10 µm.

In the case where the Δnd in the liquid crystal layer is set to be λ/4, the Δn in the liquid crystal layer in the reflective display area is set smaller than the Δn in the liquid crystal layer in the transparent display area. Specifically, as shown in FIG. 3, the distance between the electrodes in the reflective display area Lr and the distance between the electrodes in the transparent display area Lt satisfy the relation Lr>Lt. Thus, the electric field dimension in the reflective display area becomes smaller than the electric field dimension in the transparent display area, which makes the Δn in the liquid crystal layer in the reflective display area smaller than the Δn in the liquid crystal layer in the transparent display area. In such a case, it is preferable that Lr is set to be 4 to 20 µm, more preferably 4 to 10 µm. As for Lt, it is preferable that it is set to be 2 to 10 µm, more preferably 2 to 5 µm.

FIG. 3 is just like FIG. 2 except that the distance between the electrodes in the reflective display area Lr and the distance between the electrodes in the transparent display area Lt satisfy the relation Lr>Lt.

According to the configuration, the polarized light condition, in reflective display and in transparent display, on the upper polarizing plate during the transmission can be aligned as linearly polarized lights in an almost same direction, which makes the phase shift in the reflective display area and the phase shift in the transparent display area almost equal. Thus, the light use efficiency can be improved best, achieving a configuration that provides the brightest display in transparent display. A high contrast display can be also achieved. Further, a sufficient visibility in reflective display can be also ensured.

In a liquid crystal display according to the first aspect of the invention, as described above, so-called quasi-isotropic liquid crystal material that shows anisotropy by application of an electric field is used and the electric field intensity can be favorably differentiated between in the transparent display area and in the reflective display area. Thus, the problems due to a multigap structure can be effectively prevented.

Further, in a liquid crystal display according to the first aspect of the invention, there is no need for an alignment layer or for a rubbing process in manufacturing because a quasi-isotropic liquid crystal material is used. Thus, the productivity of liquid crystal displays can be improved, which in turn lowers the cost of production.

Further, in the above-mentioned liquid crystal display 1, there is an advantage that the visibility is good regardless of from where it is viewed because a transversal electric field system is adopted.

Quasi-Isotropic Liquid Crystal Material

Next, a quasi-isotropic liquid crystal material constituting the liquid crystal display 1 will be described in detail.

Figure 4:
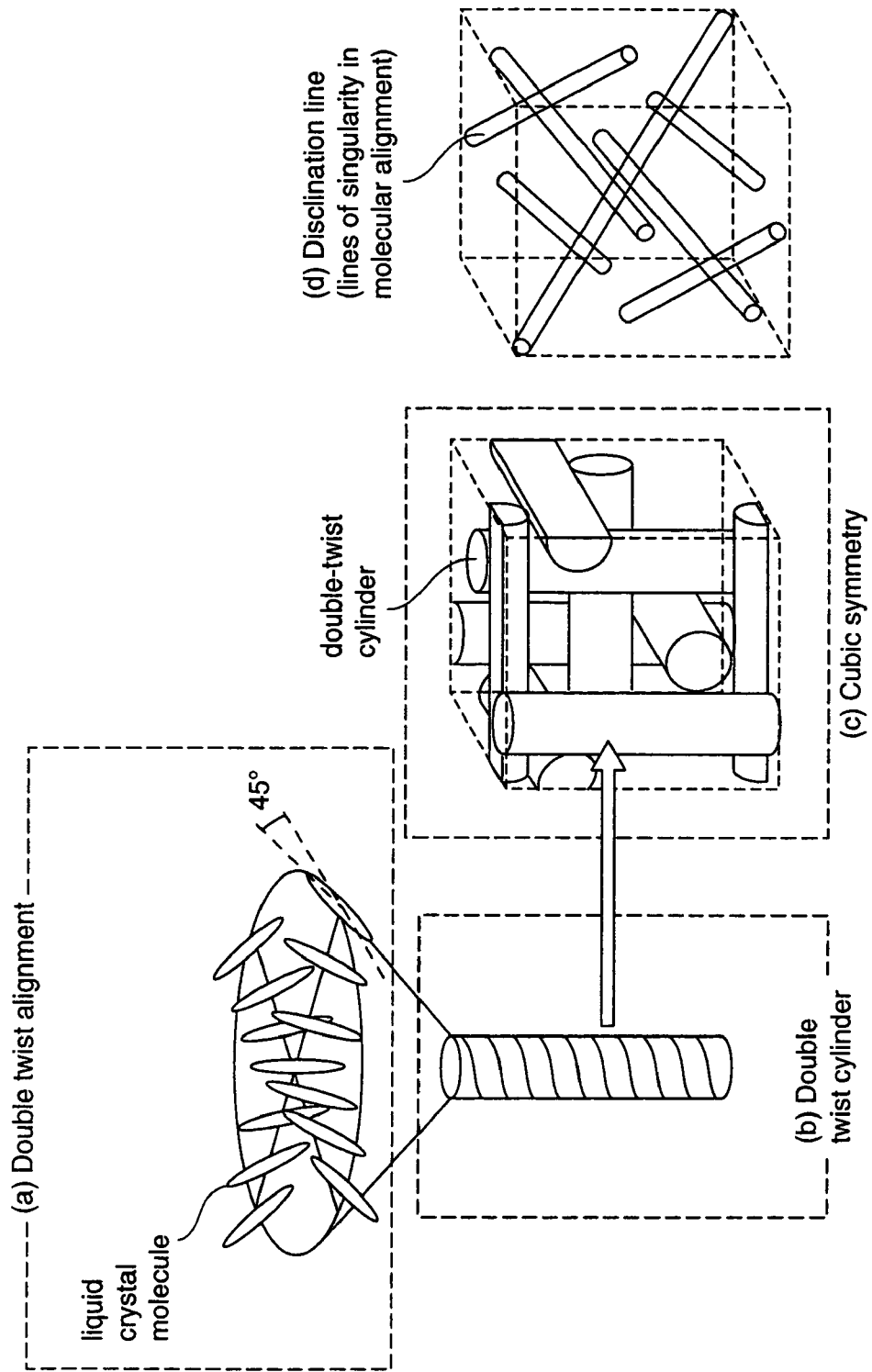
FIG. 4 is a diagram showing the molecular structure of a quasi-isotropic liquid crystal material.

FIG. 4 is a diagram showing a typical molecular structure of a quasi-isotropic liquid crystal material that can be used in an embodiment of the invention.

A quasi-isotropic liquid crystal material used in an embodiment of the invention is optically isotropic when electric field is not applied and is anisotropic when electric field is applied, the refractive index changing according to the electric field intensity.

Such a quasi-isotropic liquid crystal material, as described above, is completely different from a usual liquid crystal material and it shows behaviors completely different from those of a usual liquid crystal material, especially when applied to a transflective liquid crystal display. Specifically, in an ordinal liquid crystal material, although a liquid crystal molecule turns around when an electric field is applied and the refractive index, when viewed from in a certain direction within the liquid crystal, changes due to the spiral alignment, the refractive index of the material itself does not change. Meanwhile, in a quasi-isotropic liquid crystal material that is used in an embodiment of the invention, an optical anisotropy can be obtained by applying an electric field, which makes it possible to change the refractive index of the material itself. Further, in the quasi-isotropic liquid crystal material that is used in an embodiment of the invention, the refractive index can be changed without any macroscopic alignment behavior or movement of the material itself when the electric field is applied.

Although any type of above-mentioned quasi-isotropic liquid crystal materials can be used in an embodiment of the invention, it is preferable that the quasi-isotropic liquid crystal material is composed of a liquid crystal compound composition that includes a low molecular weight liquid crystal material and a high polymer network that is generated among the constituent elements of the low molecular weight liquid crystal material as a result of polymerization of a non-liquid crystal monomer together with a crosslinking agent. Thus, the liquid crystal response speed can be particularly quickened.

The following explanation will be given on the assumption that the quasi-isotropic liquid crystal material is composed of such a liquid crystal compound composition.

A liquid crystal compound composition (a quasi-isotropic liquid crystal material), such as described above, has generally a screwed alignment toward all the directions of the molecular lateral direction, as shown in FIG. 4, constituting a prime structure that is called a double-twist cylinder as shown in FIG. 4A. Further, double-twist cylinders (b) intersect each other, forming ultrastructure that has a body-centered cubic system as a unit cell, as shown in FIG. 4C. In the structure, molecules can not be sequentially aligned in a three-dimensional space, which results in periodic declination lines as shown in the drawing. Although such a liquid crystal compound composition (a quasi-isotropic liquid crystal material) is optically isotropic, it rapidly becomes anisotropic by application of an electric field, which allows it to transmit or shut off lights from a certain direction.

Further, such a liquid crystal compound composition has a high polymer network that is formed by polymerization of a monomer molecule (together with a crosslinking agent) that has low compatibility with a low molecular weight liquid crystal material. Thus, the temperature range in which a blue phase is exhibited (for example, a range higher than 100 degrees centigrade) can be expanded and the liquid crystal response speed can be particularly quickened.

A monomer that is used to generate a high polymer network is a non-liquid crystal monomer. Here, a non-liquid crystal monomer means a monomer that can use photo polymerization and heat polymerization for polymerization, generically meaning a monomer that does not have a cylindrical molecular structure that is common for a well-known liquid crystal (for example, a molecular structure in which alkyl group, cyano group, fluorine or the like is attached to the end of biphenyl group or biphenyl cyclohexyl group or the like). As an example, there is a monomer that includes in a molecular structure a polymeric group, such as acrylyl group, methacryloyl group, vinyl group, epoxy group, fumarate group, cinnamoyl group or the like, although it is not limited to it.

As a non-liquid crystal monomer that is used to forming a high polymer network, an acrylate monomer, for example, that includes acrylyl group or methacryloyl group in the molecular structure may be used. In particular, an acrylate monomer with a branched structure having an alkyl group as a side chain is preferable. The alkyl group is generally an alkyl group with one to four carbon atoms. It is preferable to use a monomer having at least one side chain, per a monomer unit, that is composed of such an alkyl group. In the case where a high polymer network is formed with a monomer having a non-liquid crystal molecular structure that is not branched, the expansion effect of the temperature range in which a blue phase is exhibited is relatively reduced. As an acrylate monomer, there is, for example, cyclohexyl acrylate. As an acrylate monomer having an alkyl group as a side chain, there are, for example, 2-ethyl hexyl acrylate, 1,3,3-trimethyl hexyl acrylate or the like.

A high polymer network is formed as a result of polymerization of a monomer, such as described above, together with a crosslinking agent. The crosslinking agent can be either a liquid crystal chemical compound or a non-liquid crystal chemical compound as long as it has a reactive part that can form a web structure by combining the monomer intermolecular distances responding to the used monomer. For example, in the case where an acrylate monomer is used as a monomer, a liquid crystal diacrylate monomer can be used as a crosslinking agent. However, when a crosslinking agent is not used or when the concentration of the crosslinking agent is too low, there is, for example, a possibility that it becomes difficult to sufficiently expand the temperature range in which a blue phase is exhibited (the temperature width). Further, the concentration of a high polymer network is also important. Thus, it is also necessary to ensure that a highly continuous high polymer network may be formed using a sufficient amount of monomer and crosslinking agent so as to expand the temperature width in which a blue phase is exhibited.

Although a low molecular weight liquid crystal material that constitutes a liquid crystal compound composition is not particularly limited, it is preferable to be able to exhibit a blue phase between a cholesteric phase (a chiralnematic phase) and an isotropic phase. Thus, the liquid crystal response speed can be quickened. It is preferable that the low molecular weight liquid crystal material includes a molecular structure, such as biphenyl, tarphenyl, biphenyl cyclohexyl and the like, capable of exhibiting a cholesteric phase (a chiralnematic phase) by the chirality that the material itself has due to an asymmetric atom or by addition of a chiral material (a chiral dopant), wherein preferably the spiral pitch length on the cholesteric phase (chiralnematic phase) is less than about 500 nm. Such a liquid crystal exhibits a cholesteric phase (a chiralnematic phase) at a low temperature and exhibits an isotropic phase at a higher temperature than that. Further, such a liquid crystal exhibits a blue phase within the slight temperature range between the cholesteric phase (chiralnematic phase) and the isotropic phase. Plural kinds can be used by mixture as low molecular weight liquid crystal materials.

The quasi-isotropic liquid crystal material that is used in the embodiment is composed of a liquid crystal compound composition (a high polymer network/a low molecular weight liquid crystal material) that includes a low molecular weight liquid crystal material, such as described above, and a high polymer network.

Such a liquid crystal compound composition can be obtained, for example, in the following way. Specifically, it can be obtained by dispersing a monomer and a crosslinking agent into a low molecular weight liquid crystal material to carry out polymerization at temperatures where the blue phase is retained.

The retention of the blue phase can be recognized by the observation with a polarization microscope and by the reflection spectrum measurement. Specifically, when a blue phase is exhibited, blue and yellow-green platelets (scutellum structure) that are characteristic of the blue phase are observed with a polarization microscope and a peak of the reflection spectrum is recognized at the wavelength of around 550 nm that corresponds to the yellow-green platelets.

The polymerization can be carried out, for example, either by heat polymerization or photo polymerization. However, photo polymerization using ultraviolet light is more preferable because there is a limit, in the case of using heat polymerization, to the range where the temperature at which a blue phase is retained and the polymerization temperature (heating temperature) overlap, as well as because there is a possibility that the conformation of the high polymer network changes due to heating. Further, on the occasion of polymerization, it is preferable that a polymerization initiator is dispersed, in addition to a monomer and a crosslinking agent, into a low molecular weight liquid crystal material for accelerating the polymerization speed. As a photo polymerization initiator, various kinds of initiators, such as acetophenone series, benzophenone series, benzoinether series, thioxanthone series or the like can be used. Specifically, 2,2-dimethoxy-2-phenylacetophenone or the like can be used.

As described above, for creating a liquid crystal material (a quasi-isotropic liquid crystal material) that is composed of a liquid crystal compound composition, a mixed liquid solution into which, as described above, a monomer, a crosslinking agent and, if necessary, a polymerization initiator or a chiral dopant are dispersed is filled into an appropriate cell so as to be used for polymerization reaction, as will be described below.

First, by lowering or elevating the temperature of a sample portion (a mixed liquid solution) before the polymerization, the presence of a blue phase is recognized using the observation with a polarization microscope and/or by the reflection spectrum measurement, as described above.

Next, a ultraviolet light is irradiated at the point that the weakening of the yellow-green color brightness of the platelets is recognized (by the observation with a polarization microscope and/or the reflection spectrum measurement) after lowering or elevating the temperature of the sample portion from the temperature at which the presence of a blue phase is recognized. The ultraviolet light irradiation is suspended when the yellow-green color brightness is intensified.

Then, a ultraviolet light is irradiated again at the temperature at which the yellow-green color brightness is weakened by further lowering or elevating the temperature of the sample portion. The ultraviolet light irradiation is suspended when the yellow-green color brightness is intensified.

After repeating this operation to bring the temperature at which a blue phase is exhibited (the temperature at which the yellow-green color brightness of platelets is intensified) almost into line with the temperature at which a blue phase is exhibited independently for the low molecular weight liquid crystal material, the polymerization is completed by irradiating a ultraviolet light for an additional certain period of time (for example, for one hour).

Although the above-mentioned operations are for photo polymerization, the polymerization can be done in the same way also in heat polymerization, by maintaining the system within the temperature range where the presence of a blue phase is recognized by the observation with a polarization microscope and/or the reflection spectrum measurement while the polymerization reaction makes progress.

A quasi-isotropic liquid crystal material composed of a liquid crystal compound composition that is obtained by a polymerization reaction such as described above exhibits a stable blue phase in an extensive range of temperature (temperature width). For example, among liquid crystal materials that include a high polymer network generated with an acrylate monomer having an alkyl group side chain, which is a favorable example, there are some that can exhibit a blue phase in the temperature range of more than 60 degrees centigrade, including room temperature (15 to 25 degrees centigrade). The exhibition of a blue phase of the obtained liquid crystal material can also be recognized by the observation with a polarization microscope and/or the reflection spectrum measurement, as is described above.

The quasi-isotropic liquid crystal material obtained in this way is optically isotropic when electric field is not applied and rapidly becomes anisotropic by application of a voltage, which allows it to transmit or shut off lights from a certain direction. The response speed is between 10 to 100μ per second.

Electronic Apparatus

Figure 5:
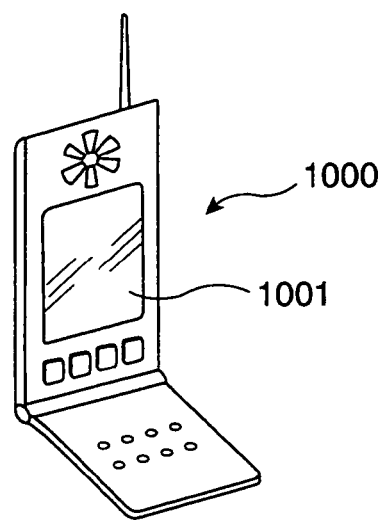
FIG. 5 is a diagram showing an example of an electronic apparatus having a liquid crystal display according to an aspect of the invention.

An example of an electronic apparatus having a liquid crystal display of the above-mentioned embodiment will be now described. FIG. 5 is an oblique diagram showing an example of a cellular phone. In FIG. 5, the sign 1000 indicates the main body of a cellular phone and the sign 1001 indicates the liquid crystal display unit using the above-mentioned liquid crystal display.

Figure 6:
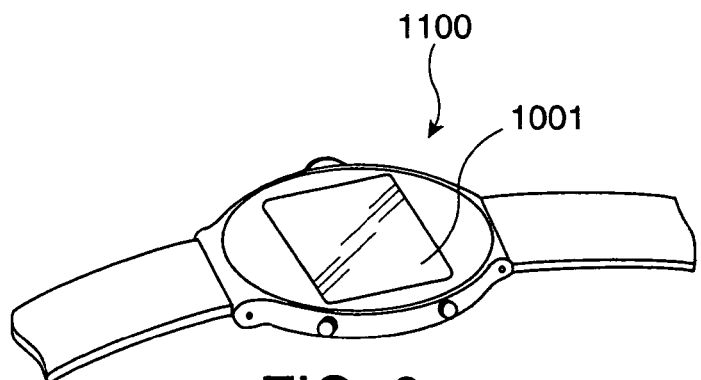
FIG. 6 is a diagram showing another example of an electronic apparatus having a liquid crystal display according to an aspect of the invention.

FIG. 6 is an oblique diagram showing an example of a wrist watch shaped electronic apparatus. In FIG. 6, the sign 1100 indicates the main body of a wrist watch and the sign 1101 indicates the liquid crystal display unit using the above-mentioned liquid crystal display.

Figure 7:
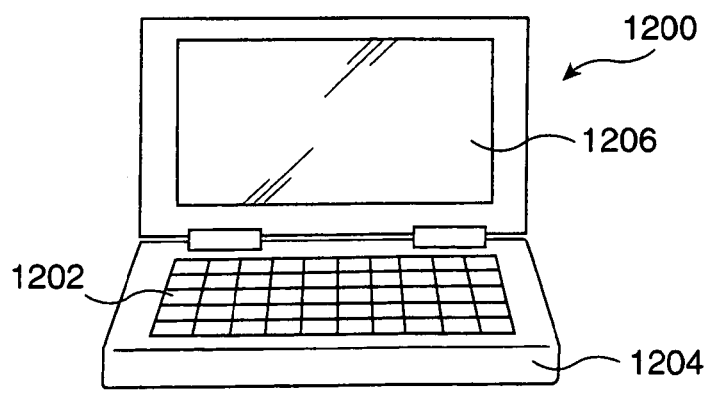
FIG. 7 is a diagram showing another example of an electronic apparatus having a liquid crystal display according to an aspect of the invention.
Figure 8:
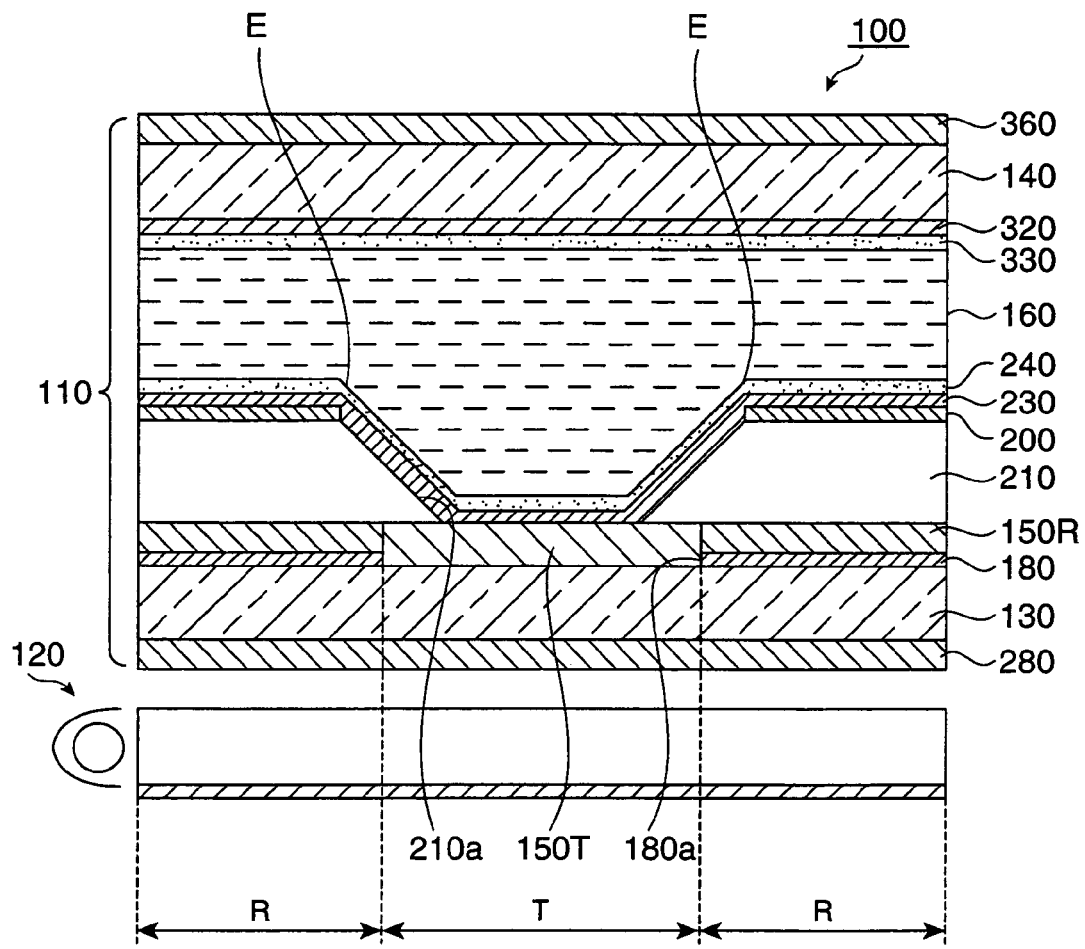
FIG. 8 is a sectional view showing a typical example of a liquid crystal display having a multigap structure.

FIG. 7 is an oblique diagram showing an example of portable information processing equipments, such as a word processor and a personal computer and the like. In FIG. 7, the sign 1200 indicates an information processing equipment, the sign 1202 indicates an input unit, such as a keyboard, the sign 1204 indicates the main body of an information processing equipment and the sign 1206 indicates the liquid crystal display unit using the above-mentioned liquid crystal display.

The electronic apparatuses shown in FIGS. 5 to 7, having a liquid crystal display unit using a liquid crystal display of the above-mentioned embodiment, has a wide viewing angle and can achieve an electronic apparatus that has a bright display unit with high-quality.

Although favorable embodiments of the invention are described above, the invention is not limited to these.

For example, although an example of a semi-transparent reflective color liquid crystal display is described in the above-mentioned embodiment, the invention is applicable regardless of whether it is in black/white or in color. Specifically, a color filter is not necessarily needed as in the above-mentioned embodiment.

Further, although a configuration in which a first electrode and a TFT for pixel switching are electrically connected is shown as an example in the above-mentioned embodiment, it is not limited to this configuration. A configuration in which a second electrode and a TFT for pixel switching are electrically connected is also applicable.

As for the concrete descriptions about the shape and size of each component of the first electrode, the second electrode, the data line, the gate line and the like as well as the number of electrode fingers and the like, it is not limited to the examples in the above-mentioned embodiment and the design can be appropriately changed.

Further, although a configuration in which a transversal electrical field is applied is explained in the above-mentioned embodiment, a configuration in which an electrical field is applied in an almost perpendicular direction toward the substrate surface, for example, is also applicable.

Further, although a case where the electric field intensity is set different between in the transparent display area and in the reflective display area by changing the distance between the electrodes is shown as an example, the invention is not limited to this. It is also possible, for example, to change the applied voltage itself between in the transparent display area and in the reflective display area.

Further, although the liquid crystal display does not have an alignment layer in the above-mentioned embodiment, an alignment layer can be placed on the side facing the liquid crystal layer of the electrode. Between the electrode and the liquid crystal layer, a layer (a passivation film) or the like for preventing the contact of the electrode and the liquid crystal material can be placed. Such a configuration particularly improves the durability of the liquid crystal material, which in turn improves the reliability of the entire liquid crystal display. As a material that constitutes such a film, there is, for example, silicon oxide (such as SiO and SiO2) or the like.

EMBODIMENTS

Making of Liquid Crystal Material

The photo polymerization monomers used in the embodiments include non-liquid crystal 2-ethylhexyl acrylate (2EHA, Aldrich), hexyl acrylate (HA, Aldrich) and 1,3,3-trimethylhexyl acrylate (TMHA, Aldrich), and liquid crystal 6-(4'-cyanobiphenyl-4-yloxy)hexylacrylate (6CBA). A liquid crystal diacrylate monomer (RM257, Merck) is used as a crosslinking agent. 2,2-dimethoxy-2-phenylacetophenone (Aldrich) is used as a photo polymerization initiator. An equimolar mixture of a fluorochemical nematic liquid crystal mixture (JC-1041XX(7), Chisso) and a cyanobiphenyl nematic liquid crystal mixture 4-cyano 4'-pentyl biphenyl (5CB, Aldrich) is used as a low molecular weight liquid crystal material. ZLI-4572(9) (Merck) is used as a chiral dopant.

The mixed liquid solution in which the above-mentioned components are blended in a predetermined composition is filled into cells in a sandwich shape with a cell thickness of 14 µm, without orientation and in an isotropic phase. The photo polymerization is carried out by irridating, for more than one hour, a ultraviolet light the irradiation intensity of which is 1.5 mW/cm2 and that is obtained via a metal halide lamp, while observing the cells into which each sample has been filled using a polarization microscope in a crossed Nichol configuration to confirm, according to the above-mentioned process, that the blue phase is maintained.

Embodiment Example 1

A liquid crystal display having a multigap structure just like the liquid crystal display shown in FIG. 2 is created using a quasi-isotropic liquid crystal material obtained in the above-mentioned process.

In the process, the phase contrast of a liquid crystal layer is set to satisfy the equation $\Delta nd=270$ nm ($\lambda/2$). The absorption axis of the polarizing plate is set in the direction corresponding to an angle of 45 degrees from the longitudinal direction of the transparent electrode. The width of the electrode finger is set to be 2 µm, the distance between the electrodes on the transparent display area is set to be 10 µm, and the distance between the electrodes on the reflective display area is set to be 5 µm.

Then, the transmittance in the transparent display area and the reflectance on the reflective display area are measured while applying voltage from 0 to 5 V on the liquid crystal display. As a result, it turned out that the transmittance and the reflectance are both around 30% when voltage is not applied, achieving an acceptable bright display both in transparent display and in reflective display. Meanwhile, in reflective display, the transmittance is far below 5% by application of a voltage around 2.5 V, which sufficiently ensures a contrast that is more than required in the actual market.

Embodiment Example 2

A liquid crystal display having a multigap structure just like the liquid crystal display shown in FIG. 3 is created using a quasi-isotropic liquid crystal material obtained in the above-mentioned process.

In the process, the phase contrast of a liquid crystal layer is set to satisfy the equation $\Delta nd=140$ nm ($\lambda/2$). The absorption axis of the polarizing plate is set to be parallel in the longitudinal direction of the transparent electrode. The phase contrast plate is placed to an angle of 15 degrees from the longitudinal direction. The electrode finger is set to be 2 µm, the distance between the electrodes on the transparent display unit is set to be 4 µm, and the distance between the electrodes on the reflective display unit is set to be 8 µm.

Then, the transmittance in the transparent display area and the reflectance on the reflective display area are measured while applying voltage from 0 to 5 V on the liquid crystal display. As a result, it turned out that the transmittance and the reflectance are both around 30% when voltage is not applied, achieving an acceptable bright display both in transparent display and in reflective display. Meanwhile, in reflective display, the transmittance is far below 5% by application of a voltage around 2.5 V, which sufficiently ensures a contrast that is more than required in the actual market.

The entire disclosure of Japanese Patent Application No. 2005-028204, filed Feb. 3, 2005 is expressly incorporated by reference herein.

What is claimed is:

1. A liquid crystal display, comprising:
   a first substrate having a reflecting portion and a transparent portion;
   a second substrate facing the first substrate; and
   a liquid crystal layer formed between the first and the second substrates, the liquid crystal layer including a quasi-isotropic liquid crystal material, the quasi-isotropic liquid crystal material being optically isotropic when a non-selected electric field is applied and being optically anisotropic when the selected electric field is applied, a refractive index of the quasi-isotropic liquid crystal material being changed according to a selected electric field intensity, the refractive index under the selected electric field in the reflecting portion being different from the refractive index under the selected electric field in the transparent portion.

2. The liquid crystal display according to claim 1, the selected electric field being applied substantially parallel to a plane of the first substrate or to a plane of the second substrate.

3. The liquid crystal display according to claim 1, one of the first substrate and the second substrate having a pixel electrode and a common electrode in each of the reflecting portion and the transparent portion, the selected electric field being applied between the pixel electrode and the common electrode.

4. The liquid crystal display according to claim 1, one of the first substrate and the second substrate having a first pixel electrode and a first common electrode in each of the reflecting portions, and a second pixel electrode and a second common electrode in each of the transparent portions, a distance between the first pixel electrode and the first common electrode being different from a distance between the second pixel electrode and the second common electrode.

5. The liquid crystal display according to claim 1, a phase contrast $\Delta nd$ of the liquid crystal layer being $\lambda/2$, the reflecting portion having a first pixel electrode and a first common electrode, the transparent portion having a second pixel electrode and a second common electrode, a distance between the first pixel electrode and the first common electrode being smaller than a distance between the second pixel electrode and the second common electrode.

6. The liquid crystal display according to claim 1, a phase contrast $\Delta nd$ of the liquid crystal layer being $\lambda/4$, the reflecting portion having a first pixel electrode and a first common electrode, the transparent portion having a second pixel electrode and a second common electrode, a distance between the first pixel electrode and the first common electrode being larger than a distance between the second pixel electrode and the second common electrode.

7. The liquid crystal display according to claim 1, wherein the substrates have a substantially flat surface on the side facing the liquid crystal layer.

8. The liquid crystal display according to claim 1, the quasi-isotropic liquid crystal material including a low molecular weight liquid crystal material and a polymer network, the polymer network being formed by a polymerization of a non-liquid crystal monomer.

9. The liquid crystal display according to claim 1, the quasi-isotropic liquid crystal material including a low molecular weight liquid crystal material and a polymer network, the low molecular weight liquid crystal material having a blue phase between a cholesteric phase and an isotropic phase.

10. The liquid crystal display according to claim 1, the quasi-isotropic liquid crystal material including a low molecular weight liquid crystal material and a polymer network, the polymer network being formed by a polymerization of a non-liquid crystal monomer, the non-liquid crystal monomer being an acrylate monomer that has an alkyl group as a side chain.

11. An electronic apparatus having the liquid crystal display according to claim 1.

* * * * *